US007106883B2

(12) United States Patent
Uchida et al.

(10) Patent No.: US 7,106,883 B2
(45) Date of Patent: Sep. 12, 2006

(54) CONTAINER POSITION MEASURING METHOD AND DEVICE FOR CARGO CRANE AND CONTAINER LANDING/STACKING METHOD

(75) Inventors: Kouji Uchida, Hiroshima (JP); Noriaki Miyata, Hiroshima (JP); Kanji Obata, Hiroshima (JP); Hirohumi Yoshikawa, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 768 days.

(21) Appl. No.: 10/149,438

(22) PCT Filed: Oct. 22, 2001

(86) PCT No.: PCT/JP01/09255

§ 371 (c)(1),
(2), (4) Date: Jun. 25, 2002

(87) PCT Pub. No.: WO02/34662

PCT Pub. Date: May 2, 2002

(65) Prior Publication Data

US 2002/0191813 A1 Dec. 19, 2002

(30) Foreign Application Priority Data

Oct. 27, 2000 (JP) ............................. 2000-329638
Jun. 29, 2001 (JP) ............................. 2001-199943

(51) Int. Cl.
*G06K 9/00* (2006.01)

(52) U.S. Cl. ...................... 382/100; 382/104; 382/151; 348/95

(58) Field of Classification Search ..................... None
See application file for complete search history.

(56) References Cited

U.S. PATENT DOCUMENTS 5,491,549 A 2/1996 Wichner et al.

(Continued)

FOREIGN PATENT DOCUMENTS

DE 44 27 138 2/1996

(Continued)

OTHER PUBLICATIONS

Copy of European Patent Office Communication including European Search Report for corresponding European Patent Application 01976799 dated Apr. 2, 2003.

*Primary Examiner*—Bhavesh M. Mehta
*Assistant Examiner*—Christopher Lavin
(74) *Attorney, Agent, or Firm*—Armstrong, Kratz, Quintos, Hanson & Brooks, LLP

(57) ABSTRACT

When image data of a target container obtained by an image pickup unit such as a CCD installed on a hoisting accessory is processed, and a line approximating the arrangement of a pixel group which causes a change in luminance or hue larger than a set value can be fitted thereto, the pixel group having the arrangement that can be approximated by such a line is determined as a ridge of the container, that is, one representing the edge of the container held by the hoisting accessory, to detect the position of the target container. Thereby, edge extraction of the target container by the processing of the image data obtained by the image pickup unit such as a CCD camera installed on the hoisting accessory can be reliably and positively performed, while eliminating influences of various situations and conditions in the actual operating environment, and relative position detection of the target container and the suspended container can be performed accurately and reliably, by utilizing the edge extraction.

9 Claims, 11 Drawing Sheets

U.S. PATENT DOCUMENTS

| | | | | |
|---|---|---|---|---|
| 5,754,672 | A | 5/1998 | Monzen et al. | |
| 6,135,301 | A | 10/2000 | Monzen et al. | |
| 6,182,843 | B1 * | 2/2001 | Tax et al. | 212/274 |
| 6,480,223 | B1 * | 11/2002 | Grasmueller | 348/87 |
| 6,880,712 | B1 * | 4/2005 | Uchida et al. | 212/276 |

FOREIGN PATENT DOCUMENTS

| | | |
|---|---|---|
| EP | 0 440 915 A1 | 8/1991 |
| EP | 0 668 237 | 8/1995 |
| JP | 5-170391 | 7/1993 |
| JP | 7-267576 | 10/1995 |
| JP | 8-157182 | 6/1996 |
| JP | 11-175729 | 7/1999 |
| WO | 92/19526 | 11/1992 |

* cited by examiner

CONTAINER POSITION MEASURING METHOD AND DEVICE FOR CARGO CRANE AND CONTAINER LANDING/STACKING METHOD

TECHNICAL FIELD

This invention relates to a container position detection method and apparatus in a cargo crane. More specifically, the present invention relates to a container position detection method and apparatus, or a container landing/stacking control method in a cargo crane, which lands or stows a hoisting accessory itself or a suspended container held by the hoisting accessory, or stows a container held by the hoisting accessory on a specified position on the ground.

BACKGROUND ART

When a hoisting accessory (generally referred to as a spreader) is landed on a container in order to hold a container stowed on the ground by a cargo crane such as a bridge crane for container yard, or when a container is stacked (including a time when a container is stowed on a specified position on the ground), it is necessary to adjust positions of the hoisting accessory or the container held by the hoisting accessory with respect to the container stowed on the ground or with respect to a specified position on the ground in predetermined accuracy. Particularly in the instance of stacking the container, it is necessary to stack the container so that horizontal displacement does not occur in the upper and lower containers.

In order to perform such operation, it is necessary to detect the specified position on the ground where the container is to be stowed, or the relative position of the container on the ground which is an object to be held by the hoisting accessory, or an object which a container held by the hoisting accessory is stacked thereon (in the explanation below, the specified position on the ground and the container on the ground to be held or stacked is referred to as an "target container") and the hoisting accessory or a container held by the hoisting accessory (in the explanation below, referred to as a "suspended container"), and it should be controlled so that there is no displacement in the relative position.

Explanation below is given, assuming that an operation of stacking a container held by a hoisting accessory on a container stowed on the ground, unless otherwise specified. However, it is a matter of course that the similar technique can be applied to the operation for landing the hoisting accessory on a container stowed on the ground or the operation for stowing a container held by the hoisting accessory on a specified position on the ground. In the explanation below, explanation about edge detection of the suspended container is also applicable to the edge detection of the hoisting accessory itself, unless otherwise specified, and explanation about the edge detection of a target container is also applicable to the edge detection of a target mark which is installed on the ground to facilitate loading in the first stage, unless otherwise specified.

As the conventional technology for detecting a position of a target container in the cargo crane, there are known one in which a distance between a hoisting accessory and a side of a container is measured by a ultrasound horizontal distance detector fitted to the hoisting accessory, so that the position of the target container is detected from the measurement, as disclosed in Japanese Patent Application Laid-Open No. 5-170391 (Patent No. 2831190), and one in which a picture of the lower part of the hoisting accessory is taken by an image pickup unit such as a CCD camera fitted to the hoisting accessory, and an edge of a target container is found by an image processing technique from the image data thereof, and the position of the target container is detected based on this finding.

In European Patent Application No. 0440915A1, there is disclosed a technique in which a corner of a target container connected to a hoisting accessory is imaged by an image pickup unit such as a CCD camera fitted downwards to the hoisting accessory, the relative position between the hoisting accessory and the target container is then detected by the image processing technique, thereby positioning at the time of connecting the container to the hoisting accessory is automatically performed by position control of the hoisting accessory based on the relative position.

The one which measures the distance between the hoisting accessory and the container side face by the horizontal distance detector has a problem of interference between the horizontal distance detector and the container. When it is tried to position the horizontal distance detector at a measurement position, at a stage where the horizontal displacement between the target container and the suspended container is large, there is the possibility that the horizontal distance detector collides with the target container, and hence it is difficult to actually put it to a practical use.

The one which picks up an image of the lower part of the hoisting accessory by the image pickup unit such as a CCD camera, and extracts the edge of the target container by the image processing technique from the obtained image data does not have the possibility of interference and collision, but has a problem in processing the image data picked up by the CCD camera or the like in the environment of the actual crane operation, to thereby extract the target container without any error. In the actual operating environment, influences of a change in the weather condition, a change in the intensity of sunlight, or shadows caused by the crane itself, the suspended container or the adjacent container stack, as well as nonuniformity of the container painting or a difference in reflectivity on the surface of the container affect the operating environment. Therefore, practical extraction of the target container cannot be realized without eliminating these influences.

This invention has been proposed in order to solve the problems related to the edge detection of the target container by the image data processing of the image pickup unit such as CCD cameras, which occur due to the influences of the environmental conditions under the actual operation and the conditions of the target container. It is an object of the present invention to provide a container position detection method in a cargo crane which promotes operation automation of the cargo crane, by reliably and positively performing edge detection of the target container by processing the image data obtained by the image pickup unit such as a CCD camera installed in a hoisting accessory, while eliminating the influences of various situations and conditions in the actual operating environment, and by using the edge detection result to accurately and positively perform the detection of the relative position between the target container and the suspended container, and a container position detection apparatus which is used for executing the method, or a container landing/stacking control method.

DISCLOSURE OF THE INVENTION

The basic points aimed at by the unit which achieves the above object are that, (1) the shape of the detection object is hexahedron, (2) each side of a shape (forming a rectangle) when a target container or a mark representing the target position of the container stowage is seen from above, and each corresponding side of the suspended container are held so as to become substantially parallel with each other, by an other method which is not described herein in detail, (3) rough relative height of the suspended container and the target container has been already known by an other measurement unit, and (4) the horizontal distance of the target container and the suspended container is held in a predetermined range by a method described later.

Use of the fact that the target container is hexahedron means that when the image data of the target container obtained from the image pickup unit such as CCD installed on the hoisting accessory is processed, and when a line approximating an arrangement of a pixel group which causes a luminance change or a hue change larger than a value set in advance can be fitted thereto, the pixel group arranged so as to be approximated by such a line is assumed to represent a ridge line of the container, that is, the edge of the container, to thereby detect the position of the target container. However, a luminance change may occur in portions other than the edges of the container due to non-uniformity of color or rust of the target container itself, or shades of surroundings, and the line extracted by the above method may not be fixed to one.

When the edge of the target container is determined from a plurality of lines which are candidates representing the edge, the above described (2), (3) and (4), or either of these is used. That is, the image pickup unit such as CCD camera installed on the hoisting accessory is arranged so as to be able to image the target container and the suspended container at the same time. In this manner, a line representing an edge corresponding to the side of the suspended container obtained by the above-described image processing, and a line representing an edge equivalent to the corresponding side of the target container can be compared with each other.

If the line representing the edge of the target container is corresponded to the line representing the corresponding edge of the suspended container, the both lines have a substantially parallel positional relation. On the other hand, since the roughly relative height of the suspended container and the target container is detected by the other unit, a rough value of the actual horizontal distance between the both lines can be determined from the relation between a line of the edge candidate of the target container and the corresponding edge line of the suspended container on the image data plane obtained by the image pickup unit such as CCD installed on the hoisting accessory. As described above, since the suspended container is positioned within a range of the horizontal distance set in advance with respect to the target container, only the candidate line judged to be within the range of the value set in advance, with respect to the rough horizontal distance obtained from the image data, is a line representing the edge of the target container.

When the above solution is used, extraction of a line representing one side of the suspended container is performed first. The suspended container is held by the hoisting accessory, and the relative position thereof with respect to the image pickup unit such as CCD installed on the hoisting accessory does not change. Therefore, while the suspended container is moved close to the target position, a luminance change of the pixel is checked with respect to the image data obtained from the image pickup unit such as CCD, and fitting processing of an approximating line with respect to the arrangement of the pixel group which causes a luminance change larger than a preset value is repetitively performed. When a line can be fitted at all times to the same position within the image data plane, the line can be determined to be an edge of the suspended container. Here, the image data plane stands for a plane in which pixels of the image data obtained by the image pickup unit such as CCD is two-dimensionally distributed. The position of each pixel is defined by two-dimensional coordinates set in the image data plane.

When the hoisting accessory is to be landed on the target container, it is necessary to detect the relative position of the hoisting accessory and the target container, and it is also necessary to detect the position of the hoisting accessory itself, as explained above about the suspended container. Actually, it is difficult to arrange the image pickup unit on the hoisting accessory so that pictures of the hoisting accessory and the target container can be taken at the same time. However, since the arrangement of the image pickup unit on the hoisting accessory is already known, it is possible to virtually set the position of the line representing the edge of the hoisting accessory with respect to the plane of the image data obtained by the image pickup unit. Hence, the edge of the target container with respect to the hoisting accessory can be detected, in the same manner as that of when the edge line of the target container is detected by the comparison with the edge line of the suspended container.

When the edge detection of the target container is performed by the image data processing, a change in luminance or hue of each pixel is checked with respect to the area in a belt-like image data plane being parallel with a line in the image data plane representing the edge of the suspended container and having a width corresponding to the horizontal distance range set in advance between the suspended container and the target container. Fitting of a line approximating the arrangement of a pixel group which causes a luminance change exceeding a value set in advance is performed. The fitted line as an approximation of arrangement of these pixel groups is a line which becomes a candidate representing the edge of the target container.

A plurality of lines may be detected as a result of the processing, due to a change in reflectivity on the paint of the target container, shadows of the adjacent crane or the like. Therefore, the parallelism of the respective line detected as a candidate of the edge and a line representing a side of the suspended container is checked, to thereby extract the one being substantially parallel. If a plurality of candidate lines is detected even with the parallelism check, the longest line among these is determined as the edge of the target container.

When containers are to be stowed on the ground, it is assumed that a shape or a mark having the same effect as that of when the container position is detected is installed at the position to be stowed, and the intended function can be achieved by detecting such a shape or mark by the similar method.

Further, the edge detection of the target container can be ensured by comparing and referring to each other an each edge candidate line of the target container obtained by the image data obtained by imaging the lower part of the hoisting accessory by two image pickup units respectively arranged on the opposite ends of the same side of the hoisting accessory. The arrangement of the two image pickup units on the hoisting accessory are such that the two image pickup units are in a substantially symmetrical position, with respect to a midpoint of one side where these image pickup units are fitted. Pictures of the lower part of the hoisting accessory are taken by the two image pickup units arranged in this manner, and a change in the luminance or hue is checked and an edge candidate line is detected in the respective image data. If the candidate lines detected separately are compared with each other to select one which forms substantially one line, it is the one which has detected the same side of the target container. As a result, more accurate detection becomes possible, as compared with the time when the edge is detected by only one image pickup unit.

According to the container position detection method of this invention, when an edge of the target container is extracted from the respective image data of the two image pickup units, if the edge line on the side of the target container where the image pickup unit is installed cannot be determined by the image data obtained by one image pickup unit, the detection result of the edge position of the target container in the image data of the other image pickup unit is referred, thereby a line approaching the extension line of the edge line can be determined as the edge line on the side where the edge cannot be determined.

When the above method is executed, it is necessary to install the image pickup unit such as CCD so as to be projected from the structure which distinguishes the outer periphery of the hoisting accessory, and to arrange the image pickup unit such that even if the hoisting accessory holds a container, the hoisting accessory does not block the field of view of the image pickup unit, and the image pickup unit can reliably catch the image of the target container.

Further, due to a reason that the load distribution of the container held by the hoisting accessory is not uniform, or the like, the hoisting accessory inclines, and as a result, if the direction of the center of the visual field of the image pickup unit inclines, an error will occur in the detection of the relative position of the hoisting accessory and the target container. Therefore, in order to correct the influence of the inclination of the hoisting accessory, an inclination detection unit is installed on the hoisting accessory, and the relative position detection value is corrected by the detection value thereof. As another method of detecting the inclination of the hoisting accessory, a tensile force of the hoist rope is detected, and the correction can be performed utilizing that a difference in the tensile force substantially has a proportional relation with the inclination.

In order to perform loading of the container, it is necessary to detect the relative position of the target container and the container held by the hoisting accessory in the longitudinal direction and in the width direction. In this instance, the processing method of the image data obtained by the image pickup unit can be applied respectively to the longitudinal direction and the width direction. However, this method requires two apparatus, and hence it is not economical.

As described above, the line detected as one representing the position of the edge in the longitudinal direction or in the width direction, by the processing of the image data obtained by the image pickup unit is substantially on the line, and is a line formed by the pixel group having substantially the same change in luminance or hue, or an extension line thereof. Therefore, when this line is detected as one representing the edge position in the longitudinal direction, in the range of this line exceeding the end portion of the target container in the longitudinal direction, the distribution density of the pixel having a change in luminance or hue similar to the range corresponding to the edge of the target container is very low. A point on the line at which the distribution density of the pixel abruptly changes represents a position of the end portion of the target container in the longitudinal direction.

Since the shape of the target container is hexahedron, if the end position in the longitudinal direction is determined, a line orthogonal to a line representing the edge position in the longitudinal direction can be determined as an edge in the width direction. The similar method is applicable to the situation when the edge position in the width direction is detected, and by using the result, the edge position in the longitudinal direction is detected. That is, by detecting either one edge in the longitudinal or width direction, the other edge can be detected, and hence, the equipment such as the image pickup unit can be saved.

The automatic control of a cargo crane utilizing the method and apparatus which detects the relative position of a hoisting accessory or a container held by the hoisting accessory and a target container by the processing of image data obtained by an image pickup unit installed on the hoisting accessory, as described above, will now be explained in detail. This control includes a function of holding the horizontal distance of the suspended container and the target container within a range set in advance.

The automatic control in the cargo crane is to hold a container stacked on the ground at a first target position, moves the container to a second target position, and stow the container on an other container stacked on the ground, which is in the second target position, within an allowable misregistration. The container in the first target position may be on a carrier such as a trailer, and the position to stow the container in the second target position may be on the ground or on a carrier such as a trailer.

When the position to stow the container in the second target position is on the ground or on a carrier such as a trailer, it is assumed that a shape or a mark having the same effect as that of when the relative position with respect to the target container is detected is put on the ground or in the vicinity of the carrier or the like.

The position of the target container put on the ground is indicated by a distance from a reference point on the ground. On the other hand, as for the cargo crane, the position of a suspended cargo is detected as a distance from the reference point set on a crane machine. In this instance, in order to perform automatic control, it is necessary to convert the position of the suspended cargo detected with respect to the reference point on the crane to the position with respect to the reference point on the ground. This conversion is performed by first detecting the position of a crane leg with respect to the reference point on the ground, and adding the offset of position from the leg to the reference point on the crane, and then offset of position from the reference point to a trolley, which is a supporting point of the suspended cargo.

Finally, it is necessary to add a positional offset of the suspended cargo based on the position of the trolley. Such a conversion result includes an error in the whole measurement concerned with the conversion, such as the position of the crane leg with respect to the reference point on the ground. Hence, highly accurate measurement is required, and correction of influences such as structural deformation of the crane or the like is also necessary. In particular, with a trackless crane, highly accurate measurement of a position of the crane leg with respect to the reference point on the ground is difficult, and correction of a deformation of the running wheel is also difficult, thereby having a problem in performing the automatic operation. The automatic control based on a conversion of the position of the suspended cargo from the position detected from the reference point on the crane to the position with respect to the reference point on the ground is referred to as absolute position control.

When the above-described detection method for detecting the relative position of the hoisting accessory or the suspended container and the target container is used, there is no difficulty such as the absolute position control, and automation can be easily realized. It is when the hoisting accessory or the suspended container is finally landed and stacked on the target container that the highly accurate position detection and position control are required. The relative position detection method according to the present invention can directly detect the relative position of the hoisting accessory or the suspended container and the target container, regardless of the reference point on the ground, and landing and stacking can be automatically performed by controlling the position of a trolley or the like so as to remove misregistration of the relative position. The control method based on the detection of the relative position and removal of misregistration of the relative position is referred to as a relative position control mode.

On the other hand, the relative position detection is made possible when the hoisting accessory or the container held by the hoisting accessory and the target container are located within an appropriate range relative to each other in the horizontal direction. In order to control so that the hoisting accessory or the container held by the hoisting accessory and the target container are located within the appropriate range in the horizontal direction, it is necessary to perform control similar to the above-described absolute position control. That is to say, it is necessary to control so that the position of each section of the crane, such as the position of the crane leg, the position of the trolley and the position of the hoisting accessory, respectively reaches a determined position so as to agree with the position of the target container given as a distance from the reference point on the ground. However, in the control using the relative position detection, it is only required that the positioning control with respect to the position of the target container given by the reference point on the ground reaches a range in which the relative position detection can function, and hence low-accuracy control is sufficient. The control for positioning the hoisting accessory in the range of position in which the relative position detection is possible is referred to as an absolute position control mode.

As is obvious from the above description, by combining the relative position control mode and the absolute position control mode, and by automatically switching to the absolute position control mode while the hoisting accessory or the suspended container is separated from the position of the target container (in the range where the relative position detection does not function), and to the relative position control mode after the hoisting accessory or the suspended container has approached the position of the target container (in the range where the relative position detection can function), control that is not affected by the deformation of the crane machine or the like can be realized, without requiring highly accurate position detection and positioning control of the position of the crane leg, the position of the trolley and the position of the suspended cargo with respect to the trolley. Such control has a particularly remarkable effect in a trackless crane, in which position detection and positioning of the crane leg with respect to the reference point on the ground is difficult, and a deformation of a crane structure or a running tire wheel is large.

When a container held by the hoisting accessory is stowed on the first stage on the ground in a container storage yard, the above-described method for detecting misregistration of the relative position by edge extraction of the already stowed container cannot be used. As a measure to solve this, in the periphery of a rectangular area, being a position to stow the container on the ground, belt-like coloring (including adhering a tape or painting) different from the surface luminance or hue of the ground is provided, outside the rectangle, and in the range where image pickup is possible by an image pickup unit installed on the hoisting accessory, parallel with one side or a plurality of sides of the rectangle. Thereby, the relative position of the suspended container and the stowing area on the ground can be detected by the same method as that of detecting the edge of the stowed container. The similar effect can be obtained by arranging a substance having a line ridge to the similar position, instead of coloring the ground.

The belt-like coloring applied on the ground in the container storage yard or the substance having a ridge is referred to as a target position mark. The target position mark is arranged with respect to a predetermined position to stow the container in the container storage yard with a positional relation in the horizontal direction determined in advance. Therefore, a deviation of the container held by the hoisting accessory from the target container or the relative position in the horizontal direction with respect to the target position mark is detected by applying the container position detection method of the present invention, and when the deviation becomes within the allowable range, the container held by the hoisting accessory is landed on the target container or onto a predetermined position on the ground. As a result, control for automatically landing the container held by the hoisting accessory onto a predetermined position on the ground can be performed. Even for the instance of stacking on the second or following stage, the detected amount of the relative position of the suspended container and the target position mark is used instead of the relative position detection between the suspended container and the target container, or together therewith, thereby enabling automatic control of stacking.

When a container held by the hoisting accessory is to be stowed by manual operation, the detection result of the relative position is displayed on a display device, and can be used as an assisting unit for the operation. When manual operation is to be performed, the position of the container held by the hoisting accessory and the target container may not be visually confirmed. In this instance, the operation becomes difficult, thereby decreasing the working efficiency. However, the difficulty of the operation due to a restriction on the visual field can be solved and the working efficiency can be improved, by displaying the detection result of the relative position on a display device arranged in a place where the operator can easily use it, such as in an operator's cab, and by performing the operation so as to eliminate the displayed misregistration of the relative position.

The detection method of a relative position between the suspended container and the target container can be also utilized for preventing collision of the suspended container or the hoisting accessory and the stack of containers adjacent to the target container. That is, by setting the belt-like image data check area set in the detection of the relative position with the target container to the area where the adjacent container exists, the relative position with respect to the adjacent container can be detected by the image processing in the same manner as described above, and it can be controlled such that the hoisting accessory or the suspended container does not collide with the adjacent container.

BEST MODE FOR CARRYING OUT THE INVENTION

Embodiments of the container position detection method and apparatus, or the container landing and stacking control method in a cargo crane according to this invention will now be explained in detail, with reference to the accompanying drawings.

Figure 1:
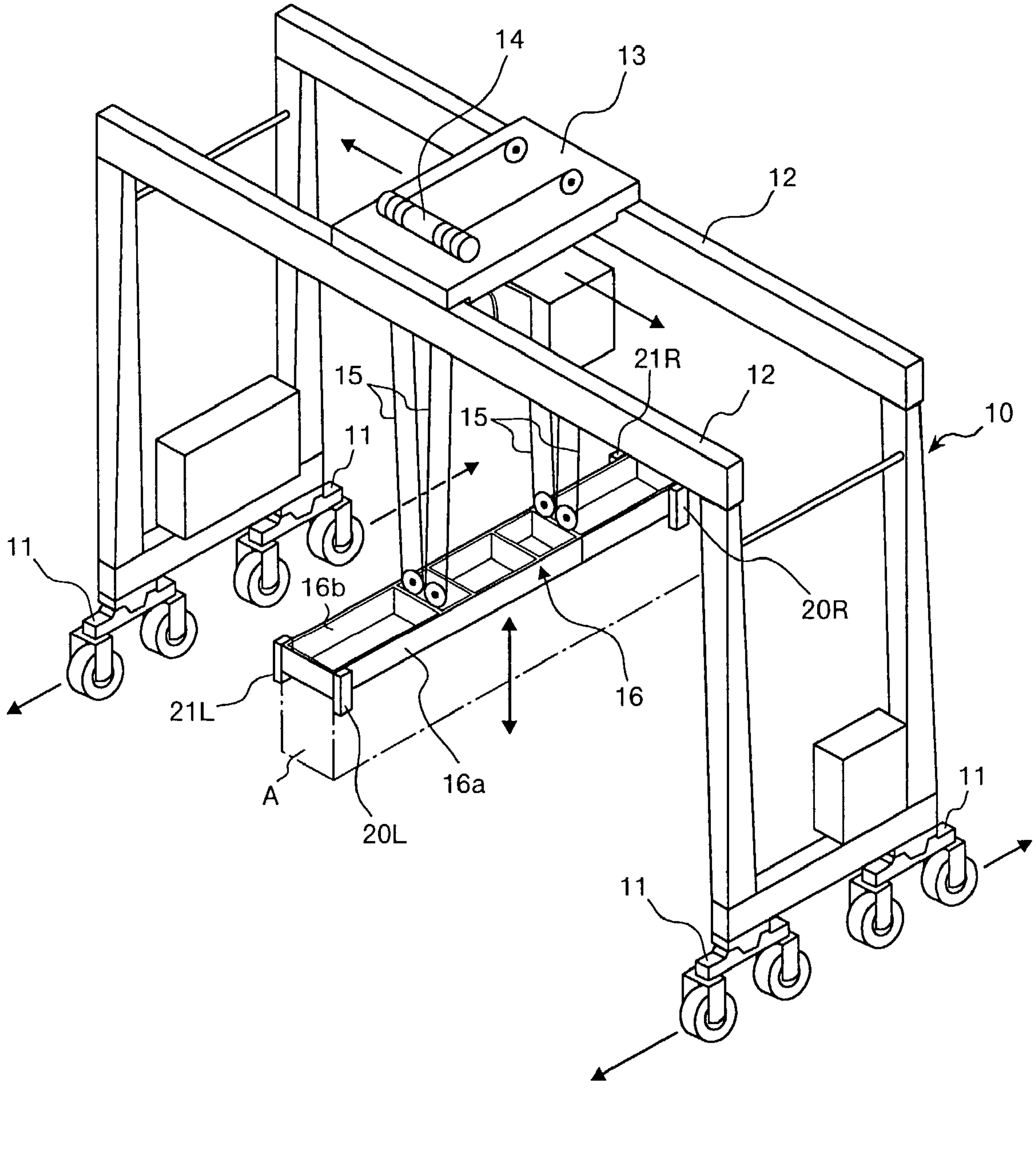
FIG. 1 is a perspective view which shows the overall construction of a crane to which the container position detection apparatus of this invention is applied.

At first, the overall construction of a crane to which the container position detection apparatus according to this invention is applied will be explained with reference to FIG. 1. This crane is a bridge crane for a tire-type yard for staking containers, and has a planer-type crane running body 10 which runs on a trackless surface by a tire-type running device 11. A transverse trolley 13 which moves in the horizontal direction along an upper beam 12 is provided on the horizontal upper beam 12 of the crane running body 10. A hoisting device 14 is installed on the transverse trolley 13, and a hoisting accessory (spreader) 16 for containers is suspended by a hanging wire 15 which is wound up and drawn out by the hoisting device 14. The hoisting accessory 16 can maintain (hold) a container A, which is a suspended cargo, so as to be able to be engaged therewith and separated therefrom.

Two CCD cameras 20R and 20L which take pictures of the lower part of the hoisting accessory are fitted downwards, respectively, at the opposite ends of one side 16*a* of the hoisting accessory 16. In this embodiment, there are also fitted downwards two CCD cameras 21R and 21L which take pictures of the lower part of the hoisting accessory, respectively, at the opposite ends of the other side 16*b* parallel with the side 16*a*.

This is for making it possible to perform edge extraction of a target container B, even if the suspended container A deviates to either side of the target container B. Since the CCD cameras 20R and 20L, 21R and 21L are handled as a pair appropriately, explanation herein is provided for an instance when the CCD cameras 20R and 20L form a pair.

Figure 2:
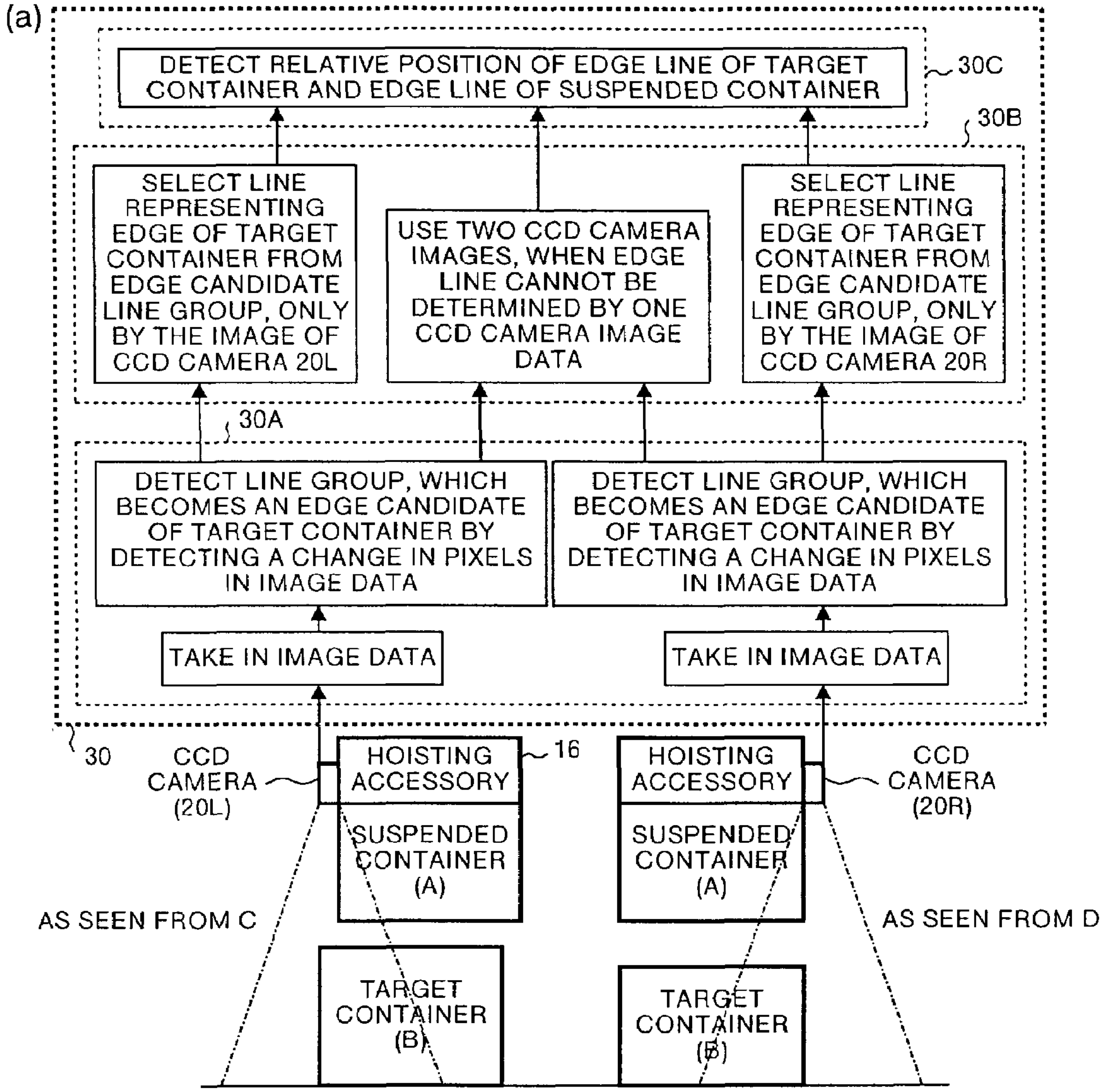
FIG. 2 is a block diagram which shows one embodiment of the container position detection apparatus according to this invention.
Figure 2:
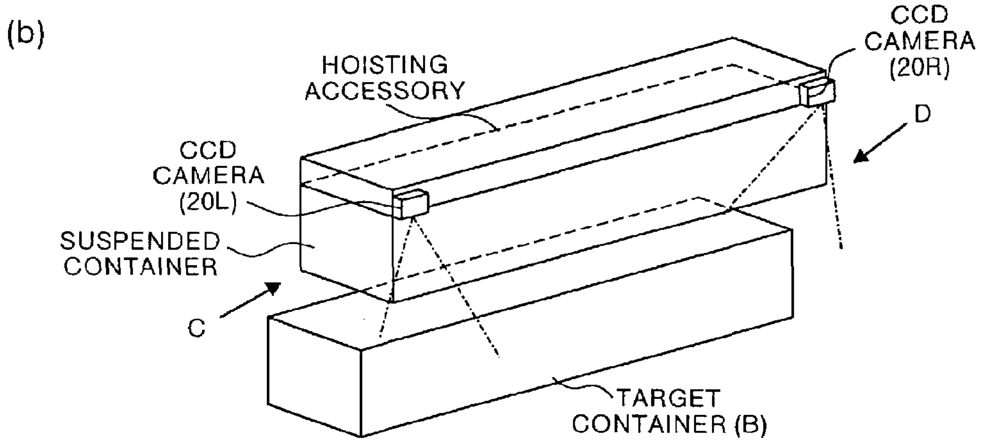

FIG. 2 shows one embodiment of the container position detection apparatus according to this invention. The container position detection apparatus includes image processing apparatus 30. The image processing apparatus 30 is constituted by a computer for image processing, and inputs the image data from the two CCD cameras 20R and 20L, respectively. The image processing apparatus 30 has a candidate group extraction section (30A) which processes the image data taken in from the CCD cameras 20R and 20L, and extracts a candidate group of a line representing an edge of the target container (B), an edge line determination section (30B) which determines the edge line of the target container (B) from the extracted edge line candidate group, and a relative position detection section (30C) which detects a relative position of the target container (B) and the suspended container (A). In 30C, the relative position of the target container (B) and the suspended container (A) is detected from the relative relation of a line determined in the image data plane as an edge line of the target container (B) in 30B, with a line determined in the same plane as an edge line of the target container (A).

When a container held by the hoisting accessory is to be stowed on the first stage on the ground in the container storage yard, in the periphery of a rectangular area, being a position to stow the container on the ground, belt-like coloring (including adhering a tape or painting) different from the surface luminance or hue of the ground is provided, outside the rectangle, and in the range where image pickup is possible by an image pickup unit installed on the hoisting accessory, parallel with one side or a plurality of sides of the rectangle. Thereby, the relative position of the suspended container and the stowing area on the ground can be detected by detecting the edge of this coloring by the two CCD cameras 20R and 20L and the image processing apparatus 30. Further, instead of coloring the ground, by arranging a substance having a line ridge in the periphery of the rectangular area, and detecting this ridge as the edge, the relative position of the suspended container and the stowing area on the ground can be detected.

Figure 3:
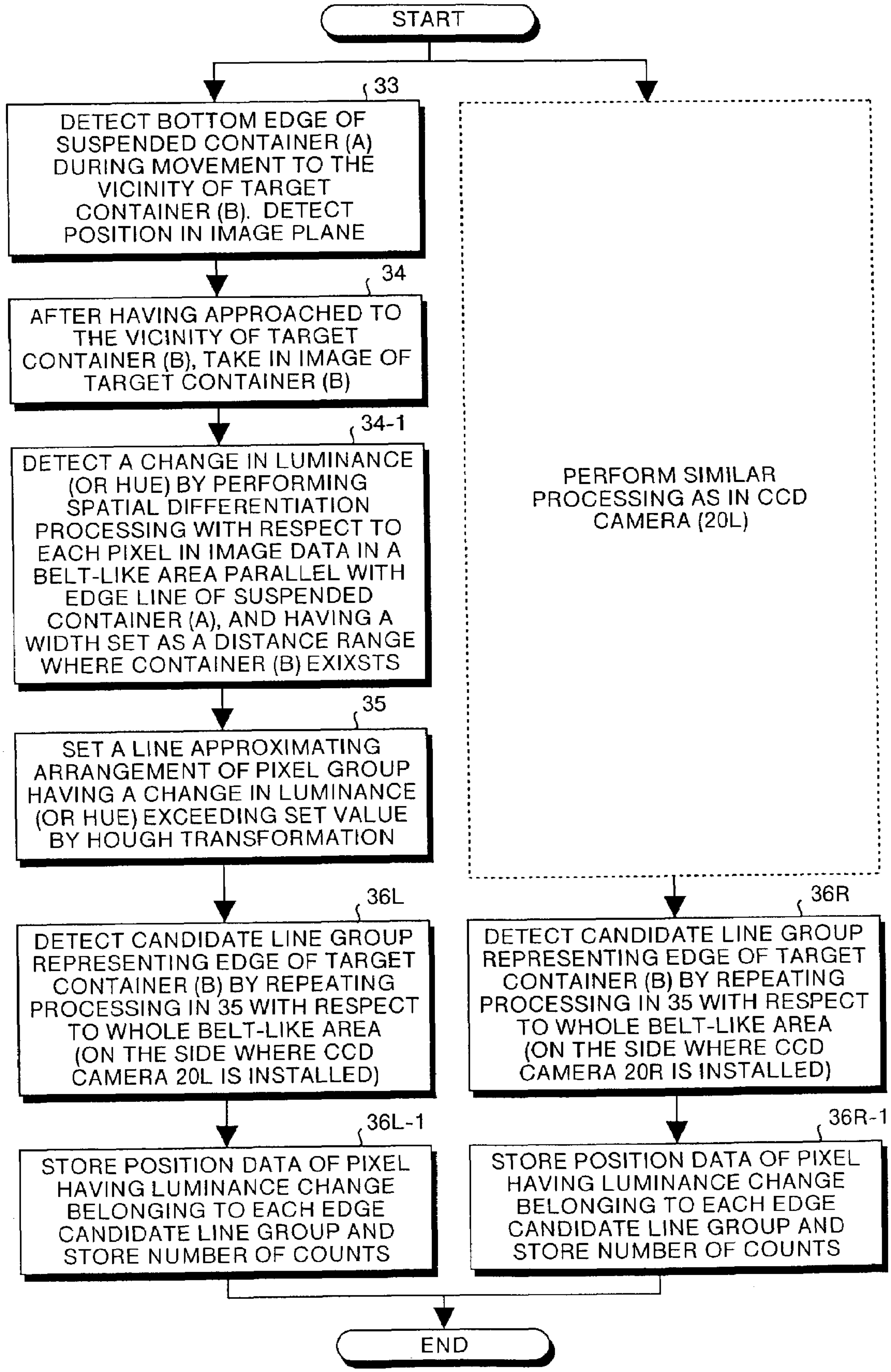
FIG. 3 is an explanatory diagram which shows a processing flow for detecting a candidate of an edge line of a target container from image data, in the container position detection apparatus according to this invention.

FIG. 3 shows the processing content of the candidate group extraction section (30A) of a line representing the edge of the target container (B) in FIG. 2. In FIG. 3, 33 shows processing for detecting an edge line of the suspended container (A), and this processing is performed after the suspended container is held by the hoisting accessory, and while the suspended container is moved to the vicinity of the target container (B) by the crane. The processing content is the same as in 34, 34-1, 35, 36L shown in FIG. 3, and 37, 38 and 39 shown in FIG. 4. Since the position of the hoisting accessory and the suspended container (A) that is, the position of the CCD camera (20L and 20R) and the suspended container is always constant, by repetitively performing the processing shown in FIG. 3 and FIG. 4, the edge line can be detected during the movement towards the target container (B).

Figure 9:
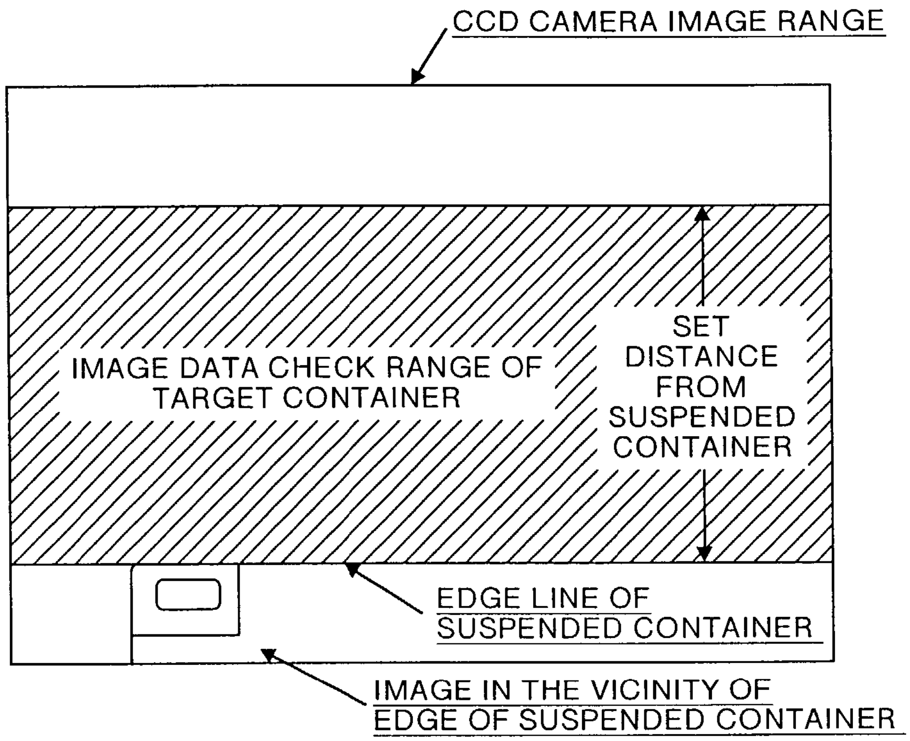
FIG. 9 is an explanatory diagram which shows an area for checking a luminance change in pixels included in the image data shown in FIG. 3.

The processing shown in 34 and onward in FIG. 3 is image processing of the target container (B) and processing for detecting the edge line, which are performed after the suspended container has been moved to the vicinity of the target container. In processing 34, the image of the target container (B) is taken in, and input to the image processing section in 34-1 onward in FIG. 3. In 34-1, since the target container (B) is parallel with the suspended container (A) and with in a distance range set in advance, a luminance change in pixels in the image data existing in a belt-like area, which is parallel with an edge line of the suspended container (A) detected in processing 33 in the image data plane, and has a width of the distance set in advance is checked. When the image data is obtained by a color camera, a change in the hue may be checked instead of the luminance. The belt-like area for checking a change in pixels in the image data is an area shown by hatching set along the edge line of the suspended container (A) shown in FIG. 9. In 34-1, the position of a pixel whose luminance changes is detected by performing spatial differentiation processing with respect to each pixel in the belt-like area to be checked. A pixel group in which the luminance change exceeds a preset threshold is extracted.

In 35 in FIG. 3, in order to set a line approximating the arrangement of the pixel groups extracted in the processing 34-1, these pixel groups are subjected to Hough transformation to thereby set a suitable line. In the belt-like area, the line set by the luminance change checking and the Hough transformation may be plural, due to a shade formed by interrupted sunlight, a change in reflectivity on the surface painting of the container or the like. In 36L in FIG. 3, when a plurality of lines are detected from the above reasons, all these lines are detected, and input to the processing for determining a line representing the edge of the target container (B) among these candidate lines.

Figure 10:
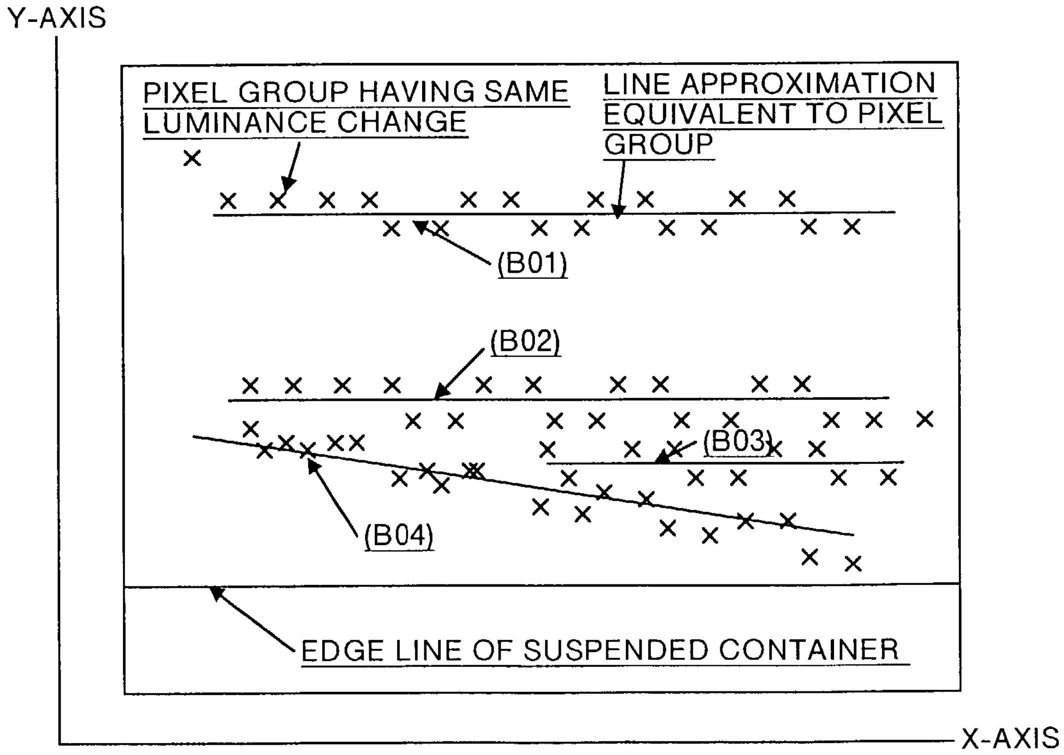
FIG. 10 is an explanatory diagram which shows processing for detecting an edge line candidate in the processing flow shown in FIG. 3.

In 36L-1 in FIG. 3, data necessary for processing for determining the edge line, that is, the number of pixels obtained in the candidate line detection processing, belonging on each candidate line, and exceeding a threshold set by the luminance change, and the position data of these pixels in the image data plane are stored. The above explanation has been performed for a CCD camera arranged on the left side of the hoisting accessory, but the same processing is performed with respect to the CCD camera on the right side. FIG. 10 is an explanatory diagram which shows the relation between distribution of pixel groups having the same luminance change and a candidate line set for this, and the candidate line is determined in the two-dimensional coordinate system set for the image data space.

FIG. 4, FIG. 5, FIG. 6 and FIG. 7 show the processing for selecting and determining the edge line of the target container, from edge line candidate lines of the target container obtained by the above-described processing. Starting from the processing in FIG. 4, and by sequentially executing these processing, the edge of the target container (B) is determined. However, it is a matter of course that if a line obtained in any stage of the processing is determined as the edge, the whole processing is not necessarily required.

Figure 4:
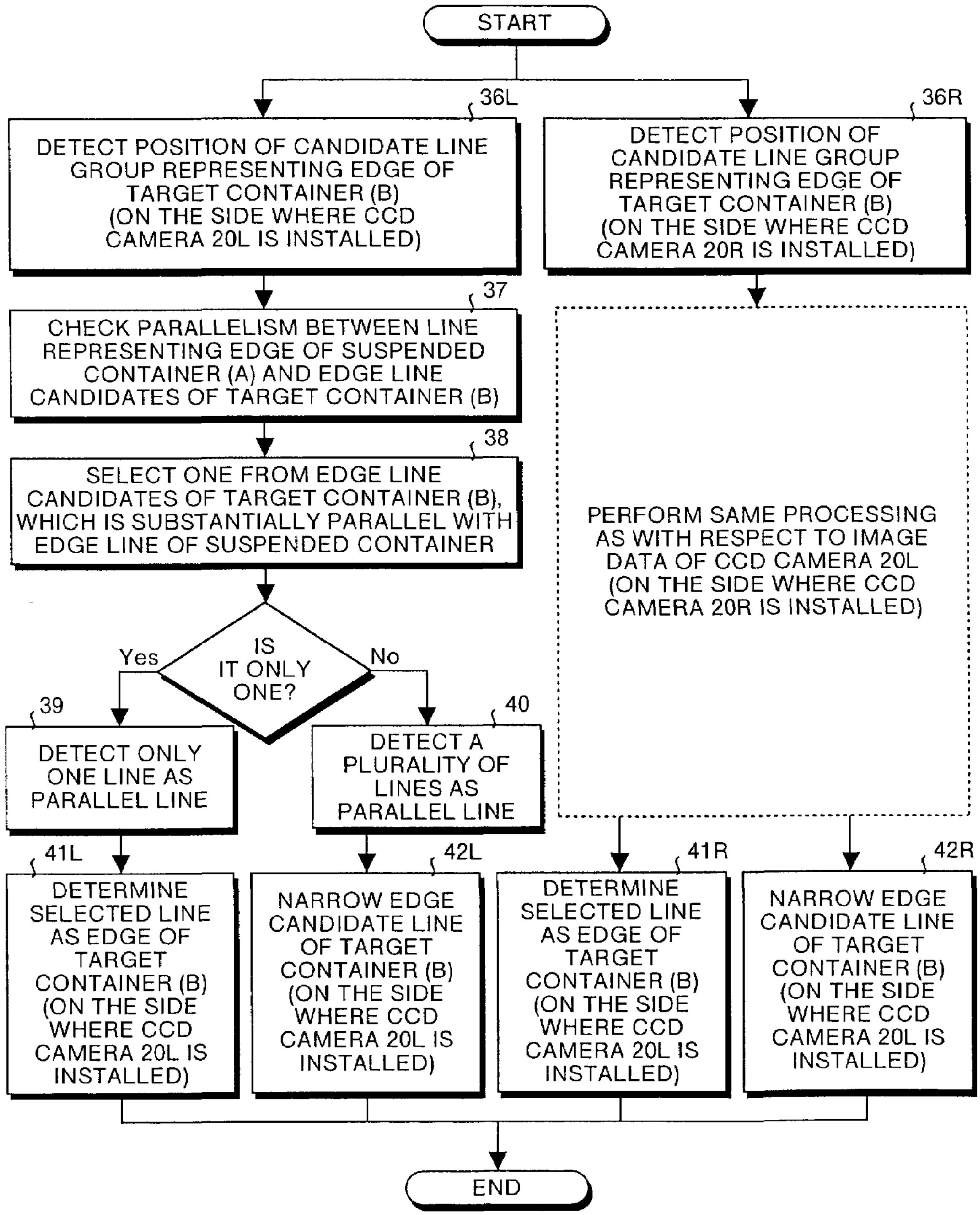
FIG. 4 is an explanatory diagram which shows a processing flow by parallelism checking with the edge line of a suspended container, of the processing for selecting and determining an edge line of a target container from an edge candidate line group.

FIG. 4 shows processing for determining an edge line of the target container by parallelism checking with the edge line of the suspended container (A), with respect to the candidate lines obtained in processing 36L in FIG. 3. The processing shown in this figure is performed with respect to the image data of the CCD camera on the left side and of the CCD camera on the right side, respectively independently. Explanation below is performed for one side only. In 37 in FIG. 4, the parallelism between each candidate line and the edge line of the suspended container (A) is checked. In 38, a line judged to be within the set threshold and parallel with the edge line of the suspended container (A) is selected, from the edge line candidates of the target container (B). In 39 in FIG. 4, if the selected candidate line is only one, this line is fixed as the edge line of the target container (B). In 39, when a plurality of candidate lines is detected, control proceeds to the next processing. The above is similarly performed for the image data of the CCD camera on the right side.

Figure 5:
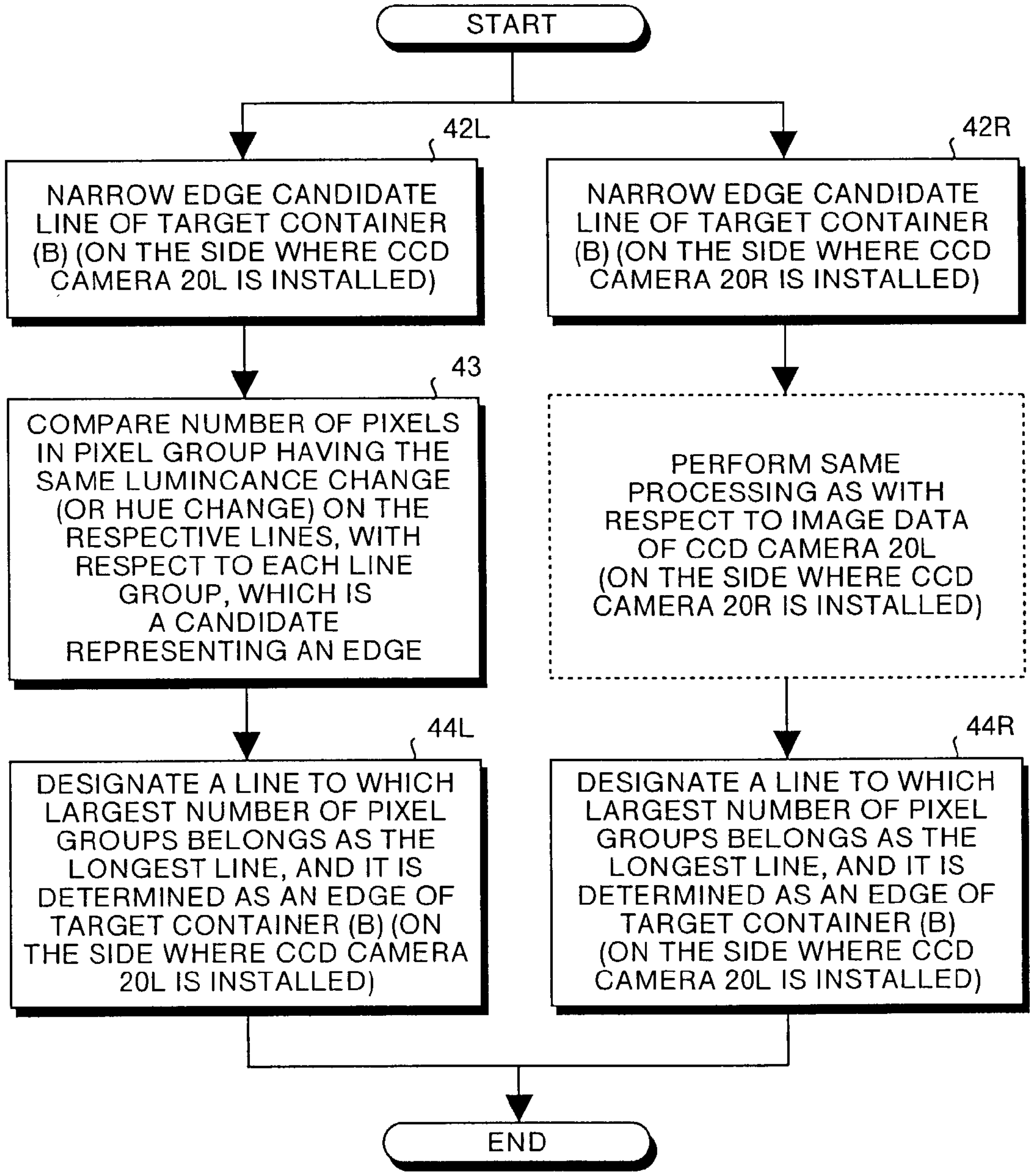
FIG. 5 is an explanatory diagram which shows a processing flow in which the longest candidate line is designated as the target edge, of the processing for selecting and determining an edge line of the target container from the edge candidate line group.

FIG. 5 shows processing for fixing the longest line as the edge line of the target container (B). This processing is also performed respectively independently for the right and left CCD cameras. For the comparison of the length of the candidate lines, the data of the number of pixels belonging to the candidate line is utilized, to designate one having a large number of pixels as a long line.

Figure 6:
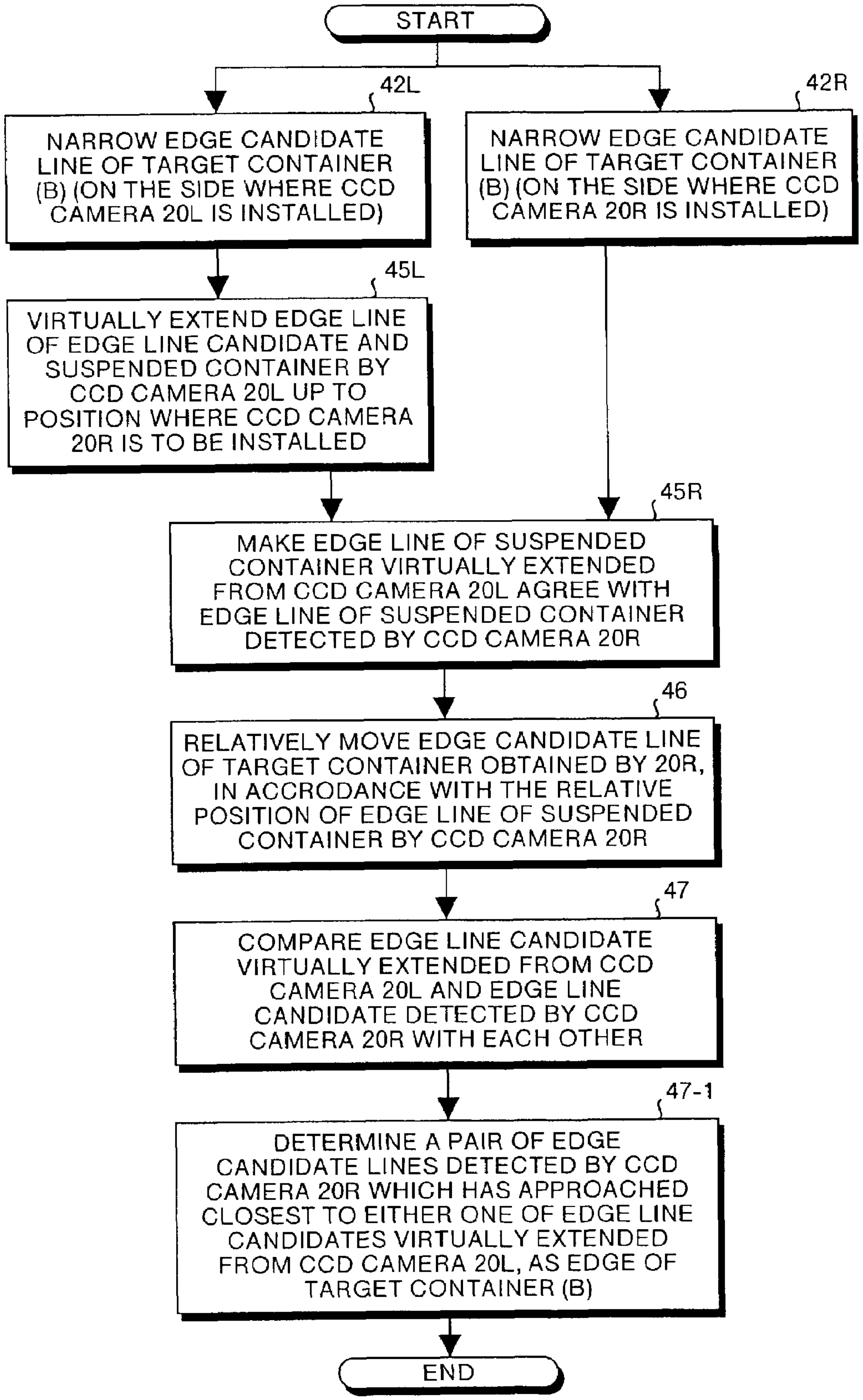
FIG. 6 is an explanatory diagram which shows a processing flow for comparing edge candidate lines obtained from the image pickup unit arranged respectively in the right and left ends of the hoisting accessory with each other, of the processing for selecting and determining an edge line of the target container from the edge candidate line group.

FIG. 6 shows processing when a target edge line cannot be determined by the processing up to FIG. 5, or when the target edge line determined by the processing up to FIG. 5 is further confirmed. The processing in FIG. 6 uses the fact that the arrangement of the right and left cameras on the hoisting accessory is known, to compare the candidate lines obtained by the both CCD camera images respectively, and when a line agreeing between the right and the left is detected, it is determined as the target edge line. The right and left CCD cameras are for taking pictures of the same one side of a bottom ridge of a suspended container. Hence, if the candidate line obtained from the image data of one camera is virtually extended to the position corresponding to the position where the other CCD camera is installed, taking the arrangement of the right and left CCD cameras into consideration, and compared with the respective candidate line obtained from the image of the other CCD camera, there is one agreeing with either one. A pair of the candidate lines agreeing with each other is the edge line of the target container (B).

FIG. 11A(a) is an explanatory diagram which shows the processing content of FIG. 6. In FIG. 11A(a), CL is an image data plane with respect to a CCD camera image on the left side, and CR is a similar plane with respect to a right side camera. AL is an edge line of a suspended container (A) caught by the left side camera, and AR is an edge line of a suspended container (A) caught by the right side camera. BL01 and BL02 are candidates for the edge line of the target container (B) by the left side camera, and BR01 and BR02 are candidates for the edge line of the target container (B) by the right side camera. BLE01, BLE02 and ALE are lines obtained by virtually extending the edge line candidates and edge line of the target container and the suspended container, respectively, by the left side camera up to a position where the right side camera is installed. BR02 which agrees best with BLE02 which is an extension of BL02 is determined as the edge line of the target container.

Figure 7:
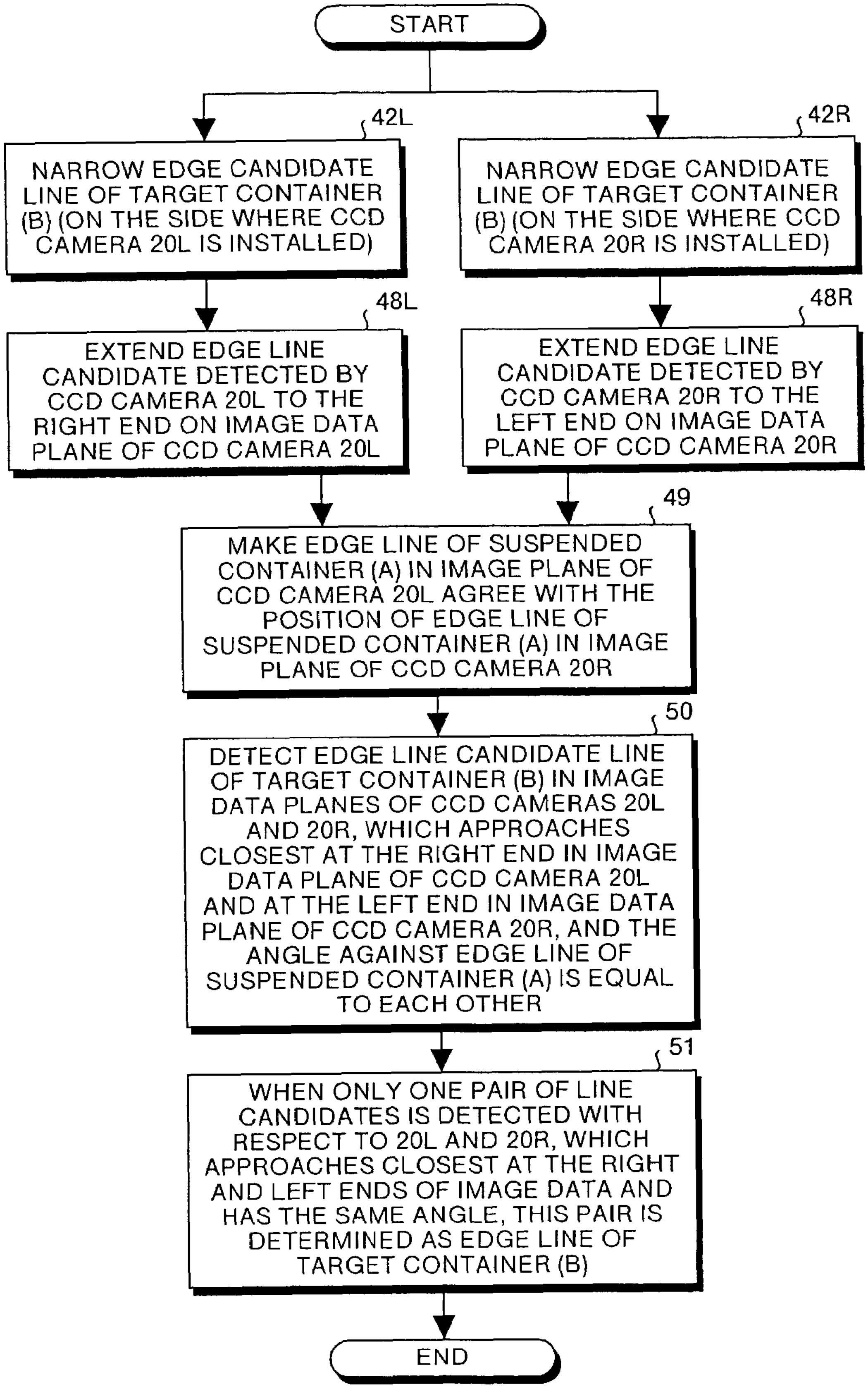
FIG. 7 is an explanatory diagram which shows a processing flow of another method for comparing edge candidate lines obtained from the image pickup unit arranged respectively in the right and left ends of the hoisting accessory with each other, of the processing for selecting and determining an edge line of the target container from the edge candidate line group.

FIG. 7. shows an other method of comparing candidate lines obtained from the images of the right and left CCD cameras. IF positions of edge lines of the suspended container respectively obtained by the right and left cameras are made to agree with each other, instead of extending a candidate line obtained from one CCD camera to the other side, when the right end of the candidate line of the left side CCD camera and the left end of the candidate line of the right side CCD camera are brought into closest contact with each other, and angles of these candidate lines with the edge line of the suspended container (A) agree with each other, these candidate lines are determined as an edge line of the target container (B).

Figure 11:
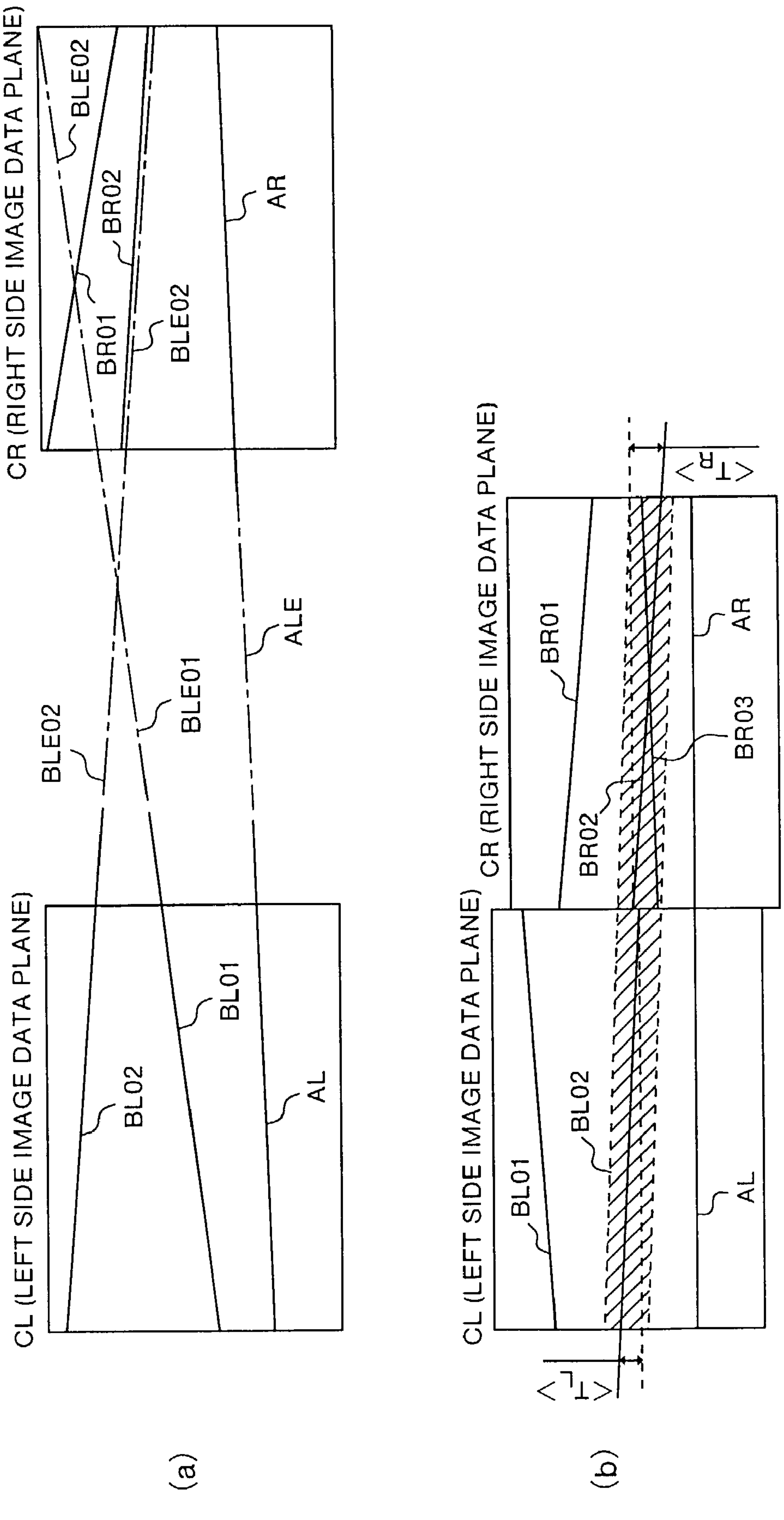
FIG. 11 is an explanatory diagram which shows processing for determining a target edge line by a comparison of edge lines obtained from image data of two CCD cameras shown in FIG. 6 and FIG. 7.

FIG. 11(*b*) shows the processing in FIG. 7. The meaning of reference symbols in the figure is the same as in FIG. 11(*a*). Edge line candidates (BR01, BR02, BR03) of the target container (B) on the image plane of the right side camera are moved in a parallel direction, so that the edge lines (AL and AR) of the suspended container (A) obtained by the image data processing of the left side CCD camera and the right side CCD camera agree with each other. In the image plane of the left side camera, a range of a threshold for agreement and identification with the edge line candidate of the right side camera is set in the vicinity of the edge line candidates (BL01, BL02) of the target container (B) (hatched range in FIG. 11. This range is displayed only for BL02). If the edge line candidate by the right side camera which agrees with the edge line candidate of the left side camera is fixed only one, this line is determined as the edge line of the target container (B) If the candidate line cannot be fixed to be only one in this processing, the edge line candidate having the closest angle ($T_L$, $T_R$) with the edge line of the suspended container (A) is selected and determined as the edge line.

Figure 8:
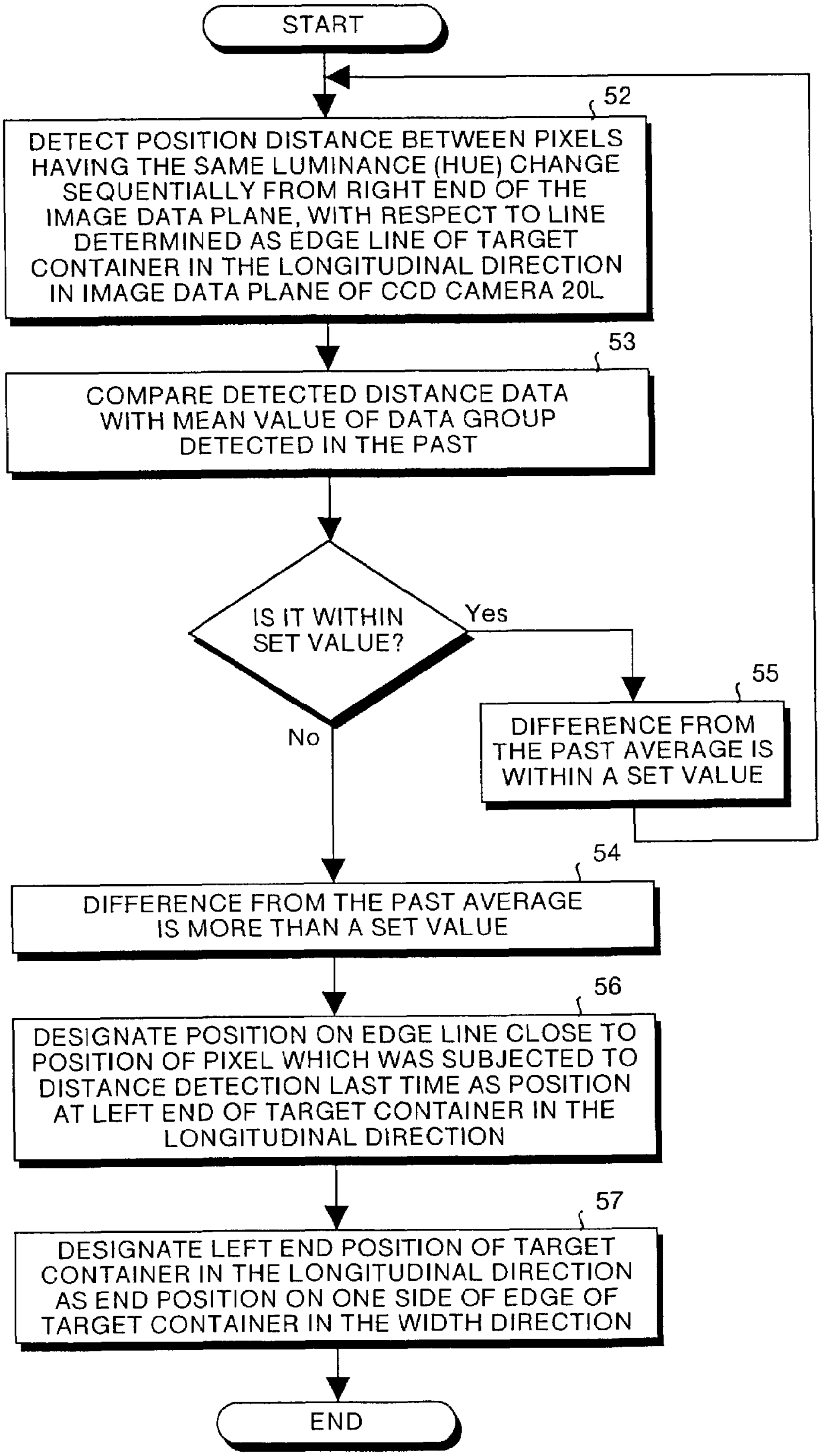
FIG. 8 is an explanatory diagram which shows a processing flow for detecting an edge end of the other orthogonal side using an edge line detected with respect to one side of a target container.

FIG. 8 shows processing for detecting an edge in the width direction, by using the edge detection result of the target container in the longitudinal direction. As shown in 36L-1 (or 36R-1) in FIG. 3, positional data of pixels belonging to the candidate line is stored at the time of setting the candidate line. With regard to the image obtained from the CCD camera arranged on the left side of the hoisting accessory, the edge line portion of the target container (B) located close to the right end of the image data plane represents an actually existing side of the target container. However, the left end of the edge line is a portion extended from the right side, though the side of the container does not exist. Therefore, distribution density of pixels belonging to the right side portion of the line is high. On the contrary, since the end of the target container in the longitudinal direction exists on the left side on the image data plane (the CCD camera is arranged in such a manner), a point at which the density of pixels belonging thereto decreases exists on the left side of the edge line, and this point is also an end portion of the edge in the width direction.

Figure 12:
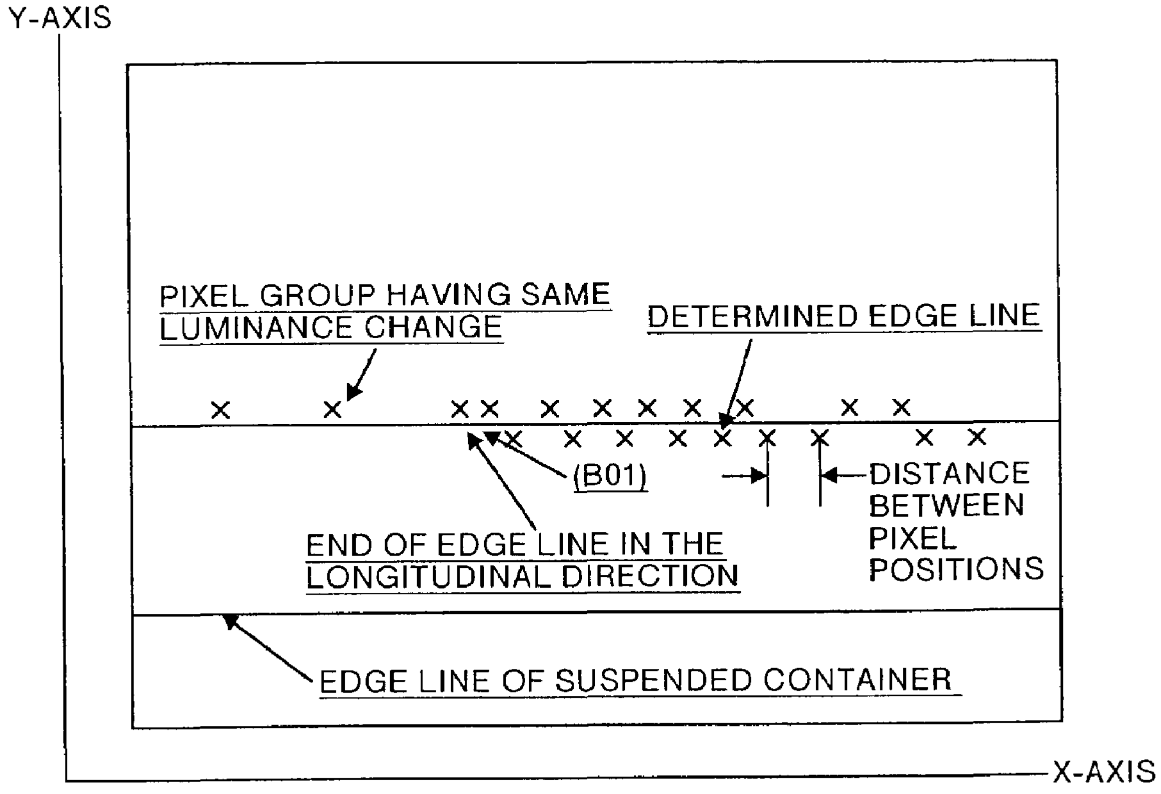
FIG. 12 is an explanatory diagram which shows a processing for detecting an edge end of the other orthogonal side using an edge line corresponding to one side of a target container shown in FIG. 8.

FIG. 12 is an explanatory diagram which shows the distribution of pixels belonging to the edge line shown in FIG. 8. The position data of pixels obtained in 36L-1 in the figure, and as shown in the processing in 52 of FIG. 8, a distance between adjacent images is sequentially obtained, from the right side on the image data plane towards the left (with regard to the CCD camera arranged on the left side). Every time a distance between images is obtained in the left direction, the past distance data is averaged. During the operation of obtaining the distance towards the left, as shown in 54 of FIG. 8, when a point at which the distance is larger than a threshold set with respect to the average of the past distance is found, it is judged that the pixel one before is the end portion of the edge line.

The flow shown in FIG. 8 shows an instance in which an edge line of the target container (B) in the longitudinal direction detected by the CCD camera 20L is used to detect the left side edge of the target container (B) in the width direction. Detection is also possible with the similar processing for other instances.

A deviation of the relative position between the edge of the container held by the hoisting accessory detected in this manner and the edge of the target container is fed back to the control system of the crane, and when the deviation comes within an allowable value, the container held by the hoisting accessory can be landed on the target container. Further, a deviation from a predetermined relative position existing between the edge of the container held by the hoisting accessory and the edge of the target position mark is fed back, and when the deviation comes within an allowable value, the container held by the hoisting accessory can be landed on a predetermined position. In this manner, the container held by the hoisting accessory can be quickly landed on a target container or on a predetermined position with respect to the target position mark with high location accuracy. Therefore, a margin of the landing space can be reduced, thereby the space, for example, in the ship or in a container stowage can be efficiently used. Further, time required for the stowing operation of containers can be shortened, and the landing accuracy can be increased without requiring fine manual corrections, and hence the stowing operation does not require much time and labor.

As is understood from the above explanation, according to the container position detection method and apparatus, or the container landing/stacking control method in a cargo crane of the present invention, image data of an image pickup unit such as a CCD camera arranged at the end of a hoisting accessory is processed, to perform edge extraction of a target container, while excluding influences of the operating environments and conditions such as shades caused by the hoisting accessory and adjacent containers. Hence, position detection of a target container based on this can be accurately and reliably performed. The automatic control of a cargo crane utilizing such a relative position detection does not require highly accurate position detection and position control of each section of the crane, as in the absolute position control, thereby the reliability is high and the cost can be reduced.

INDUSTRIAL APPLICABILITY

As explained above, the container position detection method and apparatus, and the container landing/stacking control method in a cargo crane according to the present invention is suitable for landing or stowing a hoisting accessory itself or a suspended container held by the hoisting accessory on a target container, or stowing a suspended container held by the hoisting accessory on a specified position on the ground, and useful for promoting the automatic operation of the cargo crane.

The invention claimed is:

1. A container position detection method, employed in a cargo crane, of stacking a suspended container held by a hoisting accessory on a target container stowed on the ground, and landing the hoisting accessory on the target container or stowing the suspended container on a target position on the ground, the method comprising:

an image pickup unit arranging step of arranging an image pickup unit which images the hoisting accessory or the suspended container, and the target container or a target position mark displaying a target position at the same time, at an end on one side of the hoisting accessory;

a line detection step of detecting a candidate line group which becomes a candidate for a first line representing an edge of the end of the hoisting accessory or an edge of the end of the suspended container, and for a second line representing an edge of the end of the target container or an edge of the target position mark, by detecting a change in luminance or hue of a pixel group included in the image data, which is obtained by imaging by the image pickup unit, and setting at least a line approximating the arrangement of the pixel group to be included in the candidate line group, which causes a change in luminance or hue larger than a set value;

a second line determination step of comparing parallelism and horizontal distance of the candidate line group for the first line, to determine, as the second line, a line having parallelism and horizontal distance of a value within a preset value, of lines included in the candidate line group; and a relative position detection step of detecting a relative position of the target container or the target position mark with respect to the hoisting accessory or the suspended container, from the position of the second line with respect to the first line.

2. The container position detection method according to claim 1, wherein the second line determination step includes a longest line selection step, in which the longest line in the candidate line group is selected and determined as the second line.

3. The container position detection method according to claim 1, further comprising:

an opposite ends-line detection step of constituting the image pickup unit by a first image pickup unit and a second image pickup unit, which are respectively arranged at opposite ends on the same side of the hoisting accessory, and detecting the first line and the candidate line group, respectively, based on the image data obtained by these image pickup units;

a first line agreement step of virtually extending the first line by the first image pickup unit up to the position where the second image pickup unit is installed, to thereby make the first line agree with the first line by the second image pickup unit; and a comparison and agreement selection step of virtually extending the candidate line group by the first image pickup unit up to the position where the second image pickup unit is installed, and comparing the candidate line group with the candidate line group by the second image pickup unit, to thereby select and determine a pair of line which agrees most as the second line.

4. A container landing and stacking control method, comprising a landing and stacking step in which a deviation value of the relative position of the target container or the target position mark with respect to the hoisting accessory or the suspended container, which is detected by the container position detection method according to claim 1, is fed back, and when the deviation value comes within a certain tolerance, the hoisting accessory or the suspended container is landed or stacked on the target container, or the suspended container is landed on the target position.

5. A container landing and stacking control method, employed in a cargo crane, of stacking a suspended container held by a hoisting accessory on a target container stowed on the ground, and landing the hoisting accessory on the target container or stowing the suspended container on a target position on the ground, the method comprising:

a position data generation step of generating position data of the hoisting accessory or the suspended container with respect to the target container or a position of a reference point for specifying the target position mark displaying the target position;

a relative position detection step of detecting the relative position of the target container or the target position mark with respect to the hoisting accessory or the suspended container, by the container position detection method according to claim 1;

a movement control step of moving the hoisting accessory or the suspended container to a detectable area in the vicinity of the target container or the target position mark, where detection of the relative position thereof is possible; and a landing and stacking control step, in which a deviation value of the position data is fed back, and when the deviation value comes within a certain tolerance, the hoisting accessory or the suspended container is landed or stacked on the target container, or the suspended container is landed on the target position.

6. A container position detecting apparatus, employed in a cargo crane, which stacks a suspended container held by a hoisting accessory on a target container stowed on the ground, and lands the hoisting accessory on the target container, or stows the suspended container on a target position on the ground, the container position detecting apparatus comprising:

an image pickup unit arranged at an end on one side of the hoisting accessory, which images the hoisting accessory or the suspended container, and the target container or a target position mark displaying a target position at the same time;

a line detection unit which detects a candidate line group which becomes a candidate for a first line representing an edge of the end of the hoisting accessory or an edge of the end of the suspended container, and for a second line representing an edge of the end of the target container or an edge of the target position mark, by detecting a change in luminance or hue of a pixel group included in the image data, which is obtained by imaging by the image pickup unit, and setting at least a line approximating the arrangement of the pixel group to be included in the candidate line group, which causes a change in luminance or hue larger than a set value;

a second line determination unit which compares parallelism and horizontal distance of the candidate line group for the first line, to determine, as the second line, a line having parallelism and horizontal distance of a value within a preset value, of lines included in the candidate line group; and a relative position detection unit which detects a relative position of the target container or the target position mark with respect to the hoisting accessory or the suspended container, from the position of the second line with respect to the first line.

7. The container position detection apparatus according to claim 6, wherein the second line determination unit includes a longest line selection unit, which selects and determines the longest line in the candidate line group as the second line.

8. The container position detection apparatus according to claim 7, wherein the image pickup unit is constituted by a first image pickup unit and a second image pickup unit, which are respectively arranged at opposite ends on the same side of the hoisting accessory, said apparatus further comprising:

an opposite ends-line detection unit which detects the first line and the candidate line group, respectively, based on the image data obtained by the first image pickup unit and the second image pickup unit;

a first line agreement unit which virtually extends the first line by the first image pickup unit up to the position where the second image pickup unit is installed, to thereby make the first line agree with the first line by the second image pickup unit; and a comparison and agreement selection unit which virtually extends the candidate line group by the first image pickup unit up to the position where the second image pickup unit is installed, and compares the candidate line group with the candidate line group by the second image pickup unit, to thereby select and determine a pair of lines which agrees most as the second line.

9. The container position detection apparatus according to claim 8, comprising the second line selection unit, the longest line selection unit and the comparison and agreement selection unit, and also including a selection application unit which selects and applies these units, in determining the second line.

* * * * *